(12) United States Patent  (10) Patent No.: US 9,386,310 B2
Kitamura et al.  (45) Date of Patent: Jul. 5, 2016

(54) IMAGE REPRODUCING METHOD, IMAGE REPRODUCING DEVICE, IMAGE REPRODUCING PROGRAM, IMAGING SYSTEM, AND REPRODUCING SYSTEM

(71) Applicant: Panasonic Corporation, Osaka (JP)

(72) Inventors: Shinji Kitamura, Kyoto (JP); Yukinaga Seki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 490 days.

(21) Appl. No.: 13/832,506

(22) Filed: Mar. 15, 2013

(65) Prior Publication Data

US 2013/0202044 A1 Aug. 8, 2013

Related U.S. Application Data

(63) Continuation of application No. PCT/JP2011/003347, filed on Jun. 13, 2011.

(30) Foreign Application Priority Data

Oct. 7, 2010 (JP) .................. 2010-227774

(51) Int. Cl.
*H04N 7/12* (2006.01)
*H04N 7/16* (2011.01)
(Continued)

(52) U.S. Cl.
CPC ....... *H04N 19/00569* (2013.01); *H04N 19/103* (2014.11); *H04N 19/156* (2014.11);
(Continued)

(58) Field of Classification Search
CPC .......... H04N 19/00569; H04N 19/172; H04N 19/186; H04N 19/194; H04N 19/433
See application file for complete search history.

(56) References Cited

U.S. PATENT DOCUMENTS 6,714,681 B1 3/2004 Nakamura
8,050,328 B2 * 11/2011 Iguchi ..................... H04N 5/85
375/240.25

(Continued)

FOREIGN PATENT DOCUMENTS

CN 101208954 A 6/2008
JP 2000-4440 1/2000

(Continued)

OTHER PUBLICATIONS

International Search Report of PCT Application No. PCT/JP2011/003347 dated Sep. 6, 2011.

(Continued)

*Primary Examiner* — Dave Czekaj
*Assistant Examiner* — Tsion B Owens
(74) *Attorney, Agent, or Firm* — McDermott Will & Emery LLP

(57) ABSTRACT

A image reproducing device decodes a moving picture stream having been subjected to inter-picture prediction encoding with a reference image memory accessed. A decoding processor performs variable length decoding of the moving picture stream on a picture-by-picture basis, and outputs an encoding parameter. A traffic analyzer estimates traffic to the reference image memory on the picture-by-picture basis based on the output encoding parameters. A reference image compression controller determines a compression mode in storing a reference image in the reference image memory based on the estimated traffic.

25 Claims, 12 Drawing Sheets

(51) Int. Cl.
*H04N 19/50* (2014.01)
*H04N 19/172* (2014.01)
*H04N 19/103* (2014.01)
*H04N 19/186* (2014.01)
*H04N 19/156* (2014.01)
*H04N 19/194* (2014.01)
*H04N 19/44* (2014.01)
*H04N 19/433* (2014.01)

(52) U.S. Cl.
CPC ........... *H04N19/172* (2014.11); *H04N 19/186* (2014.11); *H04N 19/194* (2014.11); *H04N 19/433* (2014.11); *H04N 19/44* (2014.11); *H04N 19/50* (2014.11)

(56) References Cited

U.S. PATENT DOCUMENTS

| | | | |
|---|---|---|---|
| 2003/0011689 A1* | 1/2003 | Shioji | H04N 1/2158 348/231.6 |
| 2003/0123554 A1 | 7/2003 | Kim et al. | |
| 2003/0194209 A1* | 10/2003 | Kim | G11B 27/005 386/343 |
| 2004/0213344 A1 | 10/2004 | Hirase et al. | |
| 2007/0171986 A1* | 7/2007 | Hannuksela | H04N 19/00 375/240.26 |
| 2007/0195882 A1 | 8/2007 | Tichelaar et al. | |
| 2007/0230572 A1* | 10/2007 | Koto | H04N 19/105 375/240.12 |
| 2007/0286502 A1 | 12/2007 | Uetani et al. | |
| 2009/0175343 A1* | 7/2009 | Pearlstein | H04N 19/00151 375/240.16 |
| 2010/0284468 A1 | 11/2010 | Hayashi | |
| 2010/0316123 A1 | 12/2010 | Inokuma | |

FOREIGN PATENT DOCUMENTS

| | | |
|---|---|---|
| JP | 2000-50272 | 2/2000 |
| JP | 2000-078568 | 3/2000 |
| JP | 3384727 | 12/2002 |
| JP | 2005-252791 | 9/2005 |
| JP | 2007-166323 | 6/2007 |
| JP | 2007-228093 | 9/2007 |
| JP | 4381430 | 10/2009 |
| JP | 2009-272948 | 11/2009 |

OTHER PUBLICATIONS

English translation of Chinese Search Report issued in Chinese Application No. 201180044223.2 dated Oct. 22, 2015.

* cited by examiner

DECODING FOR TRAFFIC ESTIMATION

601  IMAGE REPRODUCING DEVICE

FIG.13A

SIZE FOR MOTION COMPENSATION = 16 × 16
NOT ACROSS 4-BYTE BOUNDARY

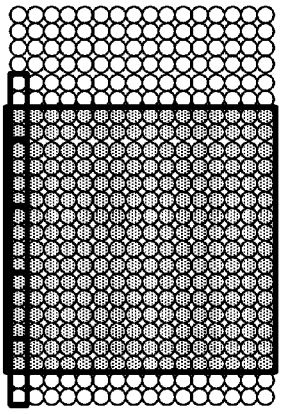

ADDRESS READ FROM REFERENCE IMAGE MEMORY =
IN 4 BYTES (4 PIXELS)
INITIAL READ ADDRESS OF REFERENCE IMAGE
(IN 1 PIXEL)

ACCESS FOR 4 × 16 = 64 ADDRESSES OCCUR
READ TRAFFIC= 256 BYTES

FIG.13B

SIZE FOR MOTION COMPENSATION = 16 × 16
ACROSS 4-BYTE BOUNDARY

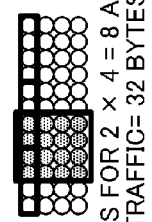

ACCESS FOR 5 × 16 = 80 ADDRESSES OCCUR
READ TRAFFIC= 320 BYTES

FIG.13C

SIZE FOR MOTION COMPENSATION = 4 × 4
NOT ACROSS 4-BYTE BOUNDARY

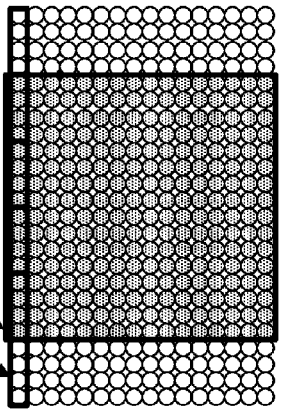

ADDRESS READ FROM REFERENCE IMAGE MEMORY =
IN 4 BYTES (4 PIXELS)
INITIAL READ ADDRESS IN REFERENCE IMAGE
(IN 1 PIXEL)

ACCESS FOR 1 × 4 = 4 ADDRESSES OCCUR
READ TRAFFIC= 16 BYTES

FIG.13D

SIZE FOR MOTION COMPENSATION = 4 × 4
ACROSS 4-BYTE BOUNDARY

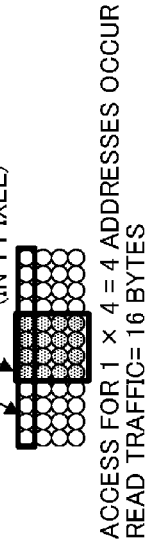

ACCESS FOR 2 × 4 = 8 ADDRESSES OCCUR
READ TRAFFIC= 32 BYTES

IMAGE REPRODUCING METHOD, IMAGE REPRODUCING DEVICE, IMAGE REPRODUCING PROGRAM, IMAGING SYSTEM, AND REPRODUCING SYSTEM

CROSS-REFERENCE TO RELATED APPLICATIONS

This is a continuation of PCT International Application No. PCT/JP2011/003347 filed on Jun. 13, 2011, which claims priority to Japanese Patent Application No. 2010-227774 filed on Oct. 7, 2010. The disclosures of these applications including the specifications, the drawings, and the claims are hereby incorporated by reference in their entirety.

BACKGROUND

The present disclosure relates to image reproducing techniques, and more particularly to image reproduction for decoding and reproducing moving picture streams encoded by inter-picture prediction encoding which compresses the amount of information by reducing time-directional redundancy.

In recent years, moving image encoding techniques such as MPEG-2 (ISO/IEC 13818-2), MPEG-4 (ISO/IEC 14496-2), and H.264 (ISO/IEC 14496-10) have been actively researched and applied to various fields such as computers, communications, household AV equipment, and broadcasting.

In such moving image encoding techniques, the amount of information is compressed by using the two types of encoding of intra-picture prediction encoding which reduces spatial-directional redundancy in a single picture, and inter-picture prediction encoding which reduces time-directional redundancy by generating a predictive image with reference to previous and subsequent pictures (i.e., reference images), which have been already encoded and decoded, and encoding the difference value between the obtained predictive image and the picture to be encoded. In order to decode and reproduce a moving picture stream, which has been subjected to the inter-picture prediction encoding, a reference image memory for temporarily storing the reference pictures to generate the predictive image is required. The reference image memory may be generally an external memory such as a DRAM, or a memory embedded in a system LSI. Memory access to the reference image memory occurs to generate the predictive image.

On the other hand, in recent years, high-definition flat panel displays such as large-screen plasma displays and liquid crystal televisions have been rapidly spread on the market. Meanwhile, small household cameras such as digital video cameras and digital still cameras, which can record high-definition television (HDTV) moving pictures, have been purchased at reasonable prices of about tens of thousands yen. In order to decode and reproduce moving picture streams captured by such a camera, a reference image memory with a high-frequency memory bandwidth needs to be mounted, thereby normally decoding the moving picture streams without any problem even when frequent memory access (i.e., traffic) to the reference image memory occurs.

In order to secure a high-frequency memory bandwidth, it is necessary to use, for example, a plurality of DRAMs with a data bit width of 32 bits, or high-performance DRAMs such as low power double data rate 2 (LPDDR2)-SDRAMs, which operate even at a high-speed operational frequency. However, in each case, packaging costs and power consumption increase, thereby causing difficulty in reducing manufacturing costs and the power consumption. In particular, reduction in the costs and the power consumption are sharply demanded in small household cameras such as digital video cameras and digital still cameras operating with small batteries. Therefore, reduction in the costs and the power consumption are actively researched in decoding moving picture streams.

Next, a general method of decoding and reproducing a moving picture stream will be described below.

FIG. 11 simply illustrates a conventional image reproducing device, which receives and sequentially decodes a moving picture stream and outputs a reproduction image. The moving picture stream to be reproduced is input from an input terminal 2. In a decoder 603, a picture layer, a slice layer, and a macroblock layer are sequentially decoded in each picture. The decoded picture is output from an output terminal 13 to a display controller (not shown). The pictures (e.g., I/P-pictures) to be left as reference images are written and temporarily stored in a reference image memory 5. Where the reference image memory 5 has, for example, a 32-bit data bus, the picture is written such that 4 pixels (i.e., 8 bits×4 pixels=32 bits) are stored in a single address. Where the reference image memory 5 has a 64-bit data bus, the picture is written such that 8 pixels (i.e., 8 bits×8 pixels=64 bits) are stored in a single address.

In decoding a picture (e.g., a P/B-picture), which has been subjected to inter-picture prediction encoding, reference images stored in the reference image memory 5 are sequentially read to generate a predictive image. The predictive image is added to a decoded difference value and output from the output terminal 13 to the display controller (not shown).

In reading each of the reference images, which are temporarily stored in the reference image memory 5 in the above-described manner, the initial read address of the reference image in the two-dimensional space is calculated based on the position of the macroblock to be decoded on the screen and the motion vector value of the macroblock. The initial read address is then converted to a read address (e.g., a 4-pixel address in a memory with a 32-bit data bus) of the reference image memory 5.

FIGS. 13A and 13B illustrate examples. Assume that the calculated initial read address of the reference image in the two-dimensional space corresponds to the boundary of addresses read from the reference image memory 5 (FIG. 13A). Read traffic of 256 bytes (64 addresses of 4 pixels) occurs in reading for generating a predictive image of 16×16 pixels, thereby causing no transfer including a pixel, which is invalid in reading. On the other hand, assume that the calculated initial read address of the reference image in the two-dimensional space does not correspond to the boundary of addresses read from the reference image memory 5 (FIG. 13B). Read traffic of 320 bytes (80 addresses of 4 pixels) occurs in reading for generating a predictive image of 16×16 pixels, thereby causing much transfer including a pixel, which is invalid pixel in reading, to increase overhead in reading.

According to the MPEG-2 standard, since motion compensation is performed in each relatively large block of 16×16 pixels in generating the predictive image, overhead in reading is not so problematic. By contrast, according to the MPEG-4 standard, motion compensation is performed in each block of not only 16×16 pixels, but also in each block of 8×8 pixels. Furthermore, according to the H.264 standard, motion compensation in finer blocks of 16×16, 16×8, 8×16, 8×8, 8×4, 4×8, and 4×4 pixels are supported as shown in FIG. 12 to further improving the accuracy in the motion compensation, thereby increasing the overhead in reading.

Specifically, for example, FIGS. 13C and 13D illustrate motion compensation in a size of 4×4 pixels. Assume that the calculated initial read address of the reference image in the two-dimensional space corresponds to the boundary of addresses read from the reference image memory 5 (FIG. 13C). The read traffic generated in reading for generating a predictive image of 4×4 pixels has 16 bytes (4 addresses of 4 pixels), thereby causing no transfer including an invalid pixel in reading. On the other hand, assume that the calculated initial read address of the reference image in the two-dimensional space does not correspond to the boundary of addresses read from the reference image memory 5 (FIG. 13D). Read traffic of 32 bytes (8 addresses of 4 pixels) occurs in reading for generating a predictive image of 4×4 pixels, thereby causing much transfer including a pixel, which is invalid pixel in reading, to increase the overhead in reading as compared to the motion compensation in 16×16 pixels.

That is, decoding of a moving picture stream requires random access on a block-by-block basis from a given pixel position indicated by a motion vector in the reference image memory 5. This hinders efficient access to the reference image memory 5 depending on the pixel position, thereby increasing the overhead in the memory access. With a decrease in the size for motion compensation for generating a predictive image, the overhead in the memory access (read access) increases.

Specifications of the reference image memory such as the capacity, the bit width of a data bus, and the operational frequency are determined by the resolution and the frame rate of moving picture streams supported by a decoder, which are defined by levels in the standards such as the MPEG-2 and the H.264. The specifications of the reference image memory are determined on the assumption of a possible worst case in the scope of the standards. Therefore, small household cameras, etc. accepting HDTV moving pictures need to include a high-performance reference image memory, thereby causing difficulty in reducing costs and power consumption.

The worst case here is, specifically, the case where pictures in a moving picture stream, which have been subjected to inter-picture prediction encoding, are encoded as follows.

- Access to a reference image memory for generating a predictive image is the transfer with greatest overhead including an invalid transfer pixel in all macroblocks in a picture.
- The size for motion compensation in a macroblock is smallest (e.g., 4×4 pixels in the H.264 standard) in all macroblocks in a picture.
- A B-picture capable of forward prediction, backward prediction, and bidirectional prediction is encoded by bidirectional prediction in all macroblocks in a picture.

Japanese Patent Publication No. 2000-50272, Japanese Patent Publication No. 2000-78568, Japanese Patent Publication No. 2000-04440, and Japanese Patent No. 4384130 suggest techniques related to reduction in the bandwidth of a memory as solutions to the problem.

According to Japanese Patent Publication No. 2000-50272 and Japanese Patent Publication No. 2000-78568, the size of a decoded image is reduced by filtering, and then the image is stored in a reference image memory. An image enlarged by filtering the reduced-size image read from the reference image memory is used as a reference image.

Japanese Patent Publication No. 2000-04440 teaches storing an image, which is obtained by compressing the decoded image by Hadamard transform and quantization, in a reference image memory. An image, which is obtained by expanding the compressed image read from the reference image memory by inverse quantization and inverse Hadamard transform, is used as a reference image.

Japanese Patent No. 4384130 teaches adaptively controlling compression distortion, which is caused by performing irreversible transform processing such as scale-down and compression, in storing a decoded image in a reference image memory so that the compression distortion is not temporally accumulated in decoding subsequent pictures.

SUMMARY

In each method of reducing the memory bandwidth shown in Japanese Patent Publication No. 2000-50272, Japanese Patent Publication No. 2000-78568, and Japanese Patent Publication No. 2000-04440, the decoded image is subjected to irreversible transform such as filtering and the combination of Hadamard transform and quantization to generate the reference image. Unnecessary compression distortion caused by the irreversible transform is superimposed to the reference image. In moving image decoding such as the MPEG-2 and the H.264 standards performing inter-picture prediction encoding, distortion of a reference image is superimposed to the next image to be decoded. Since the decoded image superimposed with the distortion is used as the next reference image, compression distortion in decoding is temporally accumulated.

In Japanese Patent Publication No. 2000-50272, Japanese Patent Publication No. 2000-78568, and Japanese Patent Publication No. 2000-04440, assume that a moving picture stream such as a high-resolution image and a high-frame rate image, which causes a large amount of memory access, is determined to be greater than an allowed memory bandwidth of the reference image memory on the assumption of the above-described worst case. The reference image is always subjected to irreversible transform to reduce the memory access regardless of the amount of the memory access in actual decoding of the moving picture stream. As a result, a noise caused by the irreversible transform is always temporally accumulated, and tends to be visually found as a large noise in the reproduced decoded image.

In the reduction in the memory access in Japanese Patent No. 4384130, two types of reference images of compressed reference images and uncompressed reference images are stored in a reference image memory to reduce the temporal accumulation of compression distortion in decoding. A picture such as a P-picture, in which compression distortion is temporally accumulated, is decoded using the uncompressed reference images. On the other hand, a picture such as a B-picture, in which compression distortion is not temporally accumulated, is decoded using the compressed reference images, thereby reducing the memory bandwidth. However, the two types of the reference images of the compressed reference images and the uncompressed reference images need to be stored in the reference image memory, thereby requiring a larger capacity memory.

Since the two types of the reference images of the compressed reference images and the uncompressed reference images need to be written to the reference image memory, read access in decoding with reference to the compressed reference images is reduced. On the other hand, write access for writing the compressed reference images to the reference image memory increases. This does not lead to great reduction in the memory bandwidth. In particular, in decoding a P-picture, the uncompressed reference images need to be read from the reference image memory not to temporally accumulate compression distortion. In addition, both of the compressed images and the uncompressed images need to be written to the reference image memory as reference images required for decoding subsequent pictures. As a result, the required memory bandwidth rather increases as compared to the case of not employing the technique of Japanese Patent No. 4384130.

Japanese Patent No. 4384130 teaches exclusively applying generation of a predictive image using a compressed reference image to a macroblock which has been subjected to bidirectional prediction, thereby reducing distortion in compressing the reference image. This is however, only applicable to, for example, the cases where the compression distortion in a picture for forward prediction occurs on the positive side, and where the compression distortion in a picture for backward prediction occurs on the negative side. Where both of the compression distortion in a picture for forward prediction and the compression distortion in a picture for backward prediction occur on the positive side or the negative side, distortion in compressing the reference image does not decrease. As a result, the distortion may be visually recognized as a noise also in decoding and reproducing a B-picture.

In order to solve the problem, it is an objective of the present disclosure to provide an image reproducing technique, which reduces temporal accumulation of compression distortion in decoding, at low costs and with low power consumption.

According to an aspect of the present disclosure, an image reproducing method decodes a moving picture stream having been subjected to inter-picture prediction encoding with a reference image memory accessed. The method includes performing first decoding for decoding the moving picture stream on a picture-by-picture basis to estimate traffic to the reference image memory on the picture-by-picture basis; and performing second decoding for decoding the moving picture stream on the picture-by-picture basis to generate a reproduction image. In the second decoding, where a picture to be decoded is to be stored as a reference image in the reference image memory after being decoded, a compression mode in storing the picture to be decoded in the reference image memory is determined based on the traffic for a picture referring to the picture to be decoded, which has been estimated in the first decoding.

According to this aspect, the traffic for each picture of the moving picture stream to the reference image memory is estimated in the first decoding. In the second decoding for generating the reproduction image, where the picture to be decoded is the reference picture, the compression mode in storing the picture to be decoded in the reference image memory, which has been estimated in the first decoding, is determined based on the traffic for the picture referring to the picture to be decoded. That is, the compression mode in storing the reference image is determined based on the traffic in the memory access which has been analyzed in advance. Thus, for example, unnecessary compression is avoided, thereby reducing temporal accumulation of compression distortion in decoding as compared to conventional techniques. In addition, there is no need to mount an unnecessarily high performance memory. For example, there is no need to unnecessarily increase the number of external memories or operate a memory at a higher operational frequency.

According to the present disclosure, since the compression mode in storing the reference image is determined based on the traffic in the memory access, which has been analyzed in advance, temporal accumulation of the compression distortion in decoding is reduced as compared to conventional techniques. In addition, there is no need to mount an unnecessary high-performance memory, thereby reducing costs and power consumption at the same time.

BRIEF DESCRIPTION OF THE DRAWINGS

FIGS. 13A-13D illustrate the relationship between the sizes for motion compensation and read traffic.

DETAILED DESCRIPTION

Embodiments of the present disclosure will be described hereinafter with reference to the drawings.

First Embodiment

Figure 1:
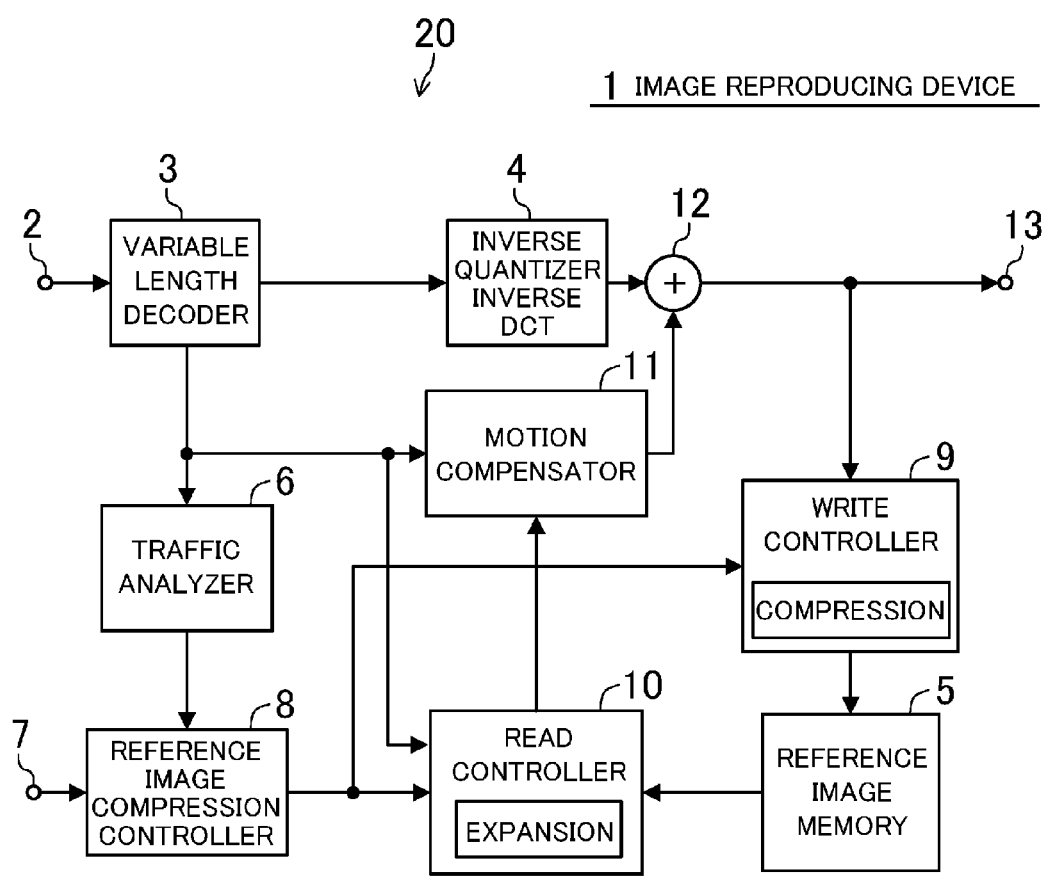
FIG. 1 illustrates the configuration of an image reproducing device according to a first embodiment.

FIG. 1 illustrates the configuration of an image reproducing device 1 according to a first embodiment. In FIG. 1, moving picture streams to be reproduced are sequentially input to an input terminal 2. A variable length decoder 3 performs variable length decoding of the input moving picture streams, and outputs various types of encoding parameters and quantization coefficients. The encoding parameters include the picture types (I/P/B-pictures), the encoding types of macroblocks (intra-/inter-picture prediction encoding), the directions of prediction (forward/backward/bidirectional prediction), the sizes for motion compensation, motion vectors, etc. An inverse quantizer/inverse DCT 4 performs inverse quantization and inverse DCT of the quantization coefficient output from the variable length decoder 3.

A reference image memory 5 temporarily stores the decoded picture as a reference image. A traffic analyzer 6 analyzes traffic to the reference image memory 5 in advance on a picture-by-picture basis based on the encoding parameters output from the variable length decoder 3. An allowed memory bandwidth (i.e., a predetermined threshold) of the reference image memory 5 is set in a setting terminal 7. A reference image compression controller 8 temporarily holds the traffic for each picture to the reference image memory 5, which has been calculated by the traffic analyzer 6. The reference image compression controller 8 compares the traffic for the picture referring to the picture to be decoded to the set allowed memory bandwidth, thereby determining a compression mode in storing the reference image into the reference image memory 5.

A write controller 9 controls writing of the reference image to the reference image memory 5 in accordance with the compression mode determined by the reference image compression controller 8. A read controller 10 controls reading of the reference image from the reference image memory 5 in accordance with an expansion mode corresponding to the compression mode determined by the reference image compression controller 8, and the motion vector output from the variable length decoder 3. The motion compensator 11 generates a predictive image from the reference image read by the read controller 10 based on the motion vector output from the variable length decoder 3. An adder 12 outputs the image data output from the inverse quantizer/inverse DCT 4 without change on macroblocks, which have been subjected to the intra-picture prediction encoding. On the other hand, the adder 12 adds the image data output from the inverse quantizer/inverse DCT 4 to the predictive image output from the motion compensator 11, and outputs the sum on macroblocks, which have been subjected to the inter-picture prediction encoding. The output terminal 13 outputs the output of the adder 12 as a reproduction image.

In FIG. 1, the variable length decoder 3, the inverse quantizer/inverse DCT 4, the motion compensator 11, and the adder 12 form a decoding processor 20. The decoding processor 20 may have other configurations, as long as it performs, on the picture-by-picture basis, the variable length decoding of a moving picture stream having been subjected to the inter-picture prediction encoding, generates a reproduction image, and outputs encoding parameters for estimating traffic to the reference image memory 5.

The flow of reproducing a moving picture stream using the image reproducing device 1 of FIG. 1 will be sequentially described with reference to FIGS. 2-5.

Figure 2:
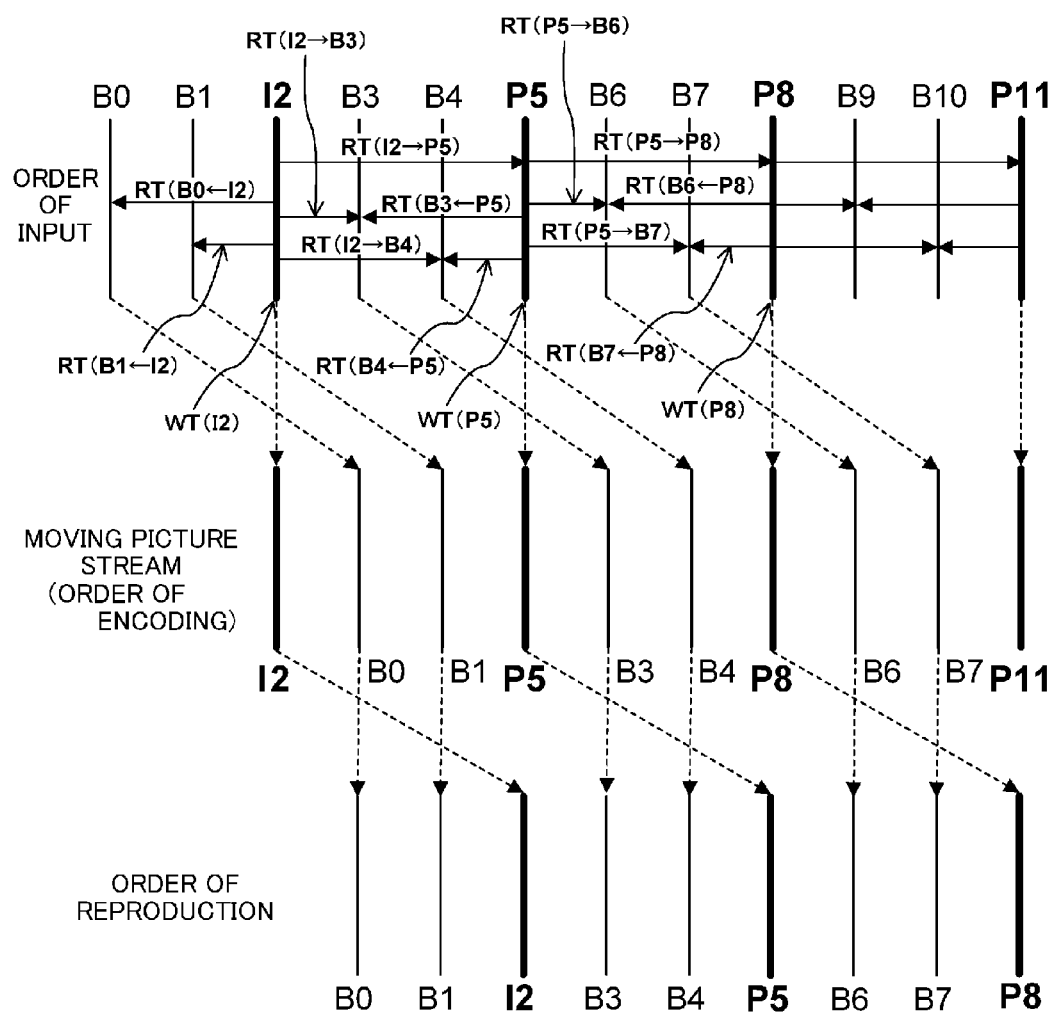
FIG. 2 illustrates an example configuration of pictures in a moving picture stream.

FIG. 2 illustrates an example configuration of pictures in a moving picture stream. In FIG. 2, the pictures of the moving picture stream are indicated in the order of input at the uppermost part, in the order of encoding at the intermediate part, and in the order of reproduction at the lower part. In FIG. 2, reference pictures are indicated by thick solid lines and boldface.

The uppermost part of FIG. 2 shows reference pictures of pictures (P/B-pictures) encoded by inter-picture prediction encoding, and read traffic (RT) of the reference pictures for generating a predictive image. For example, B3 picture is the fifth picture in the order of encoding. The reference picture of the B3 picture for forward prediction is I2 picture. The read traffic for referring to the I2 picture in decoding the B3 picture is indicated by "RT(I2→B3)." On the other hand, the reference picture of the B3 picture for backward prediction is P5 picture. The read traffic for referring to the P5 picture in decoding the B3 picture is indicated by "RT(B3←P5)." The uppermost part of FIG. 2 also shows write traffic (WT) of pictures (I/P-pictures), which may be referenced to as reference pictures in decoding other pictures, to the reference image memory. For example, write traffic of the I2 picture is indicated by "WT(I2)."

In this embodiment, the traffic to the reference image memory, which is actually generated in decoding and reproducing a moving picture stream, is analyzed in advance. Where the traffic is greater than the allowed memory bandwidth of the reference image memory 5 mounted in the image reproducing device 1, a reference image is compressed and stored in the reference image memory 5. Where the traffic is not more than the allowed memory bandwidth, the reference image is not compressed and stored in the reference image memory 5 without change. This performs control to reduce temporal transmission of distortion caused by the compression of the reference image as much as possible. Conventionally, traffic to a reference image memory has been estimated in consideration of all possible cases in decoding a moving picture stream and on the assumption of the worst case, which is least likely to occur. Thus, the reference image has always been compressed even if the traffic is actually not greater than the allowed memory bandwidth of the reference image memory in decoding and reproducing the moving picture stream to be reproduced. By contrast, in this embodiment, decoding for traffic estimation, which is for analyzing in advance, the traffic actually generated in reproducing pictures to be decoded, precedes decoding and reproduction of a moving picture stream. As a result, reference images are compressed only in pictures, in which it is determined that the reference images need to be compressed in decoding for reproduction. Reference images are not compressed in the other pictures.

Specifically, the type of encoding a moving picture stream subjected to the inter-picture prediction encoding is usually selected as appropriate to increase the encoding efficiency of macroblocks in pictures. Thus, in P-pictures and B-pictures, all macroblocks are not necessarily subjected to inter-picture prediction encoding. Many macroblocks may be subjected to intra-picture prediction encoding, which does not require reading of reference images. In addition, not all macroblocks subjected to inter-picture prediction encoding require read access to a reference image memory with great overhead (e.g., motion compensation in a smaller size, etc.). Also in B-pictures, not all macroblocks are subjected to bidirectional prediction encoding, which refers to two pictures of previous and subsequent pictures. Some macroblocks may be subjected to unidirectional prediction encoding using only forward prediction or backward prediction.

As described above, in this embodiment, the reference images are compressed within the minimum extent necessary, thereby more preferably reducing the memory bandwidth than the conventional techniques.

Figure 3:
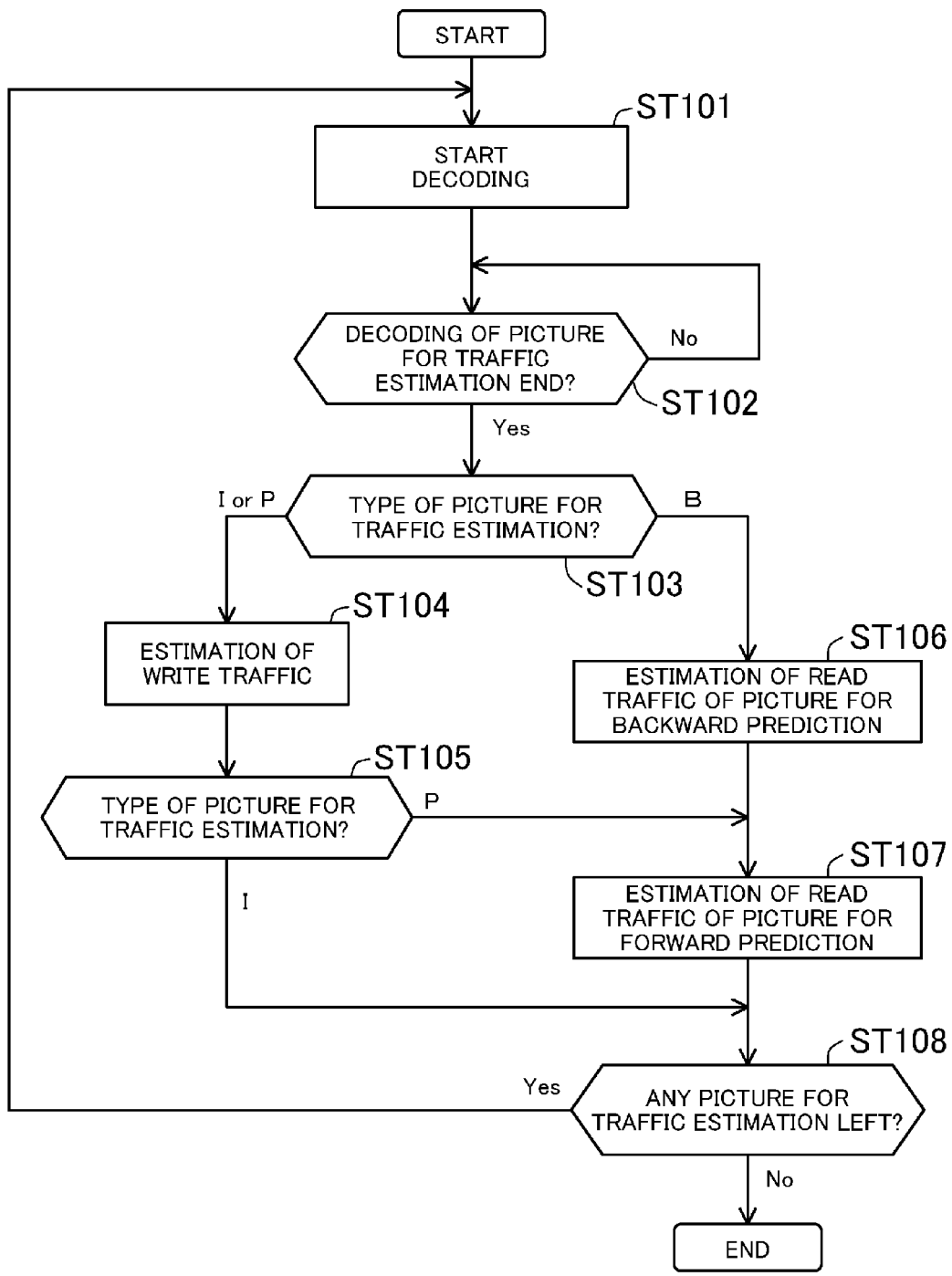
FIG. 3 is a flow chart illustrating decoding for traffic estimation according to the first embodiment.
Figure 4:
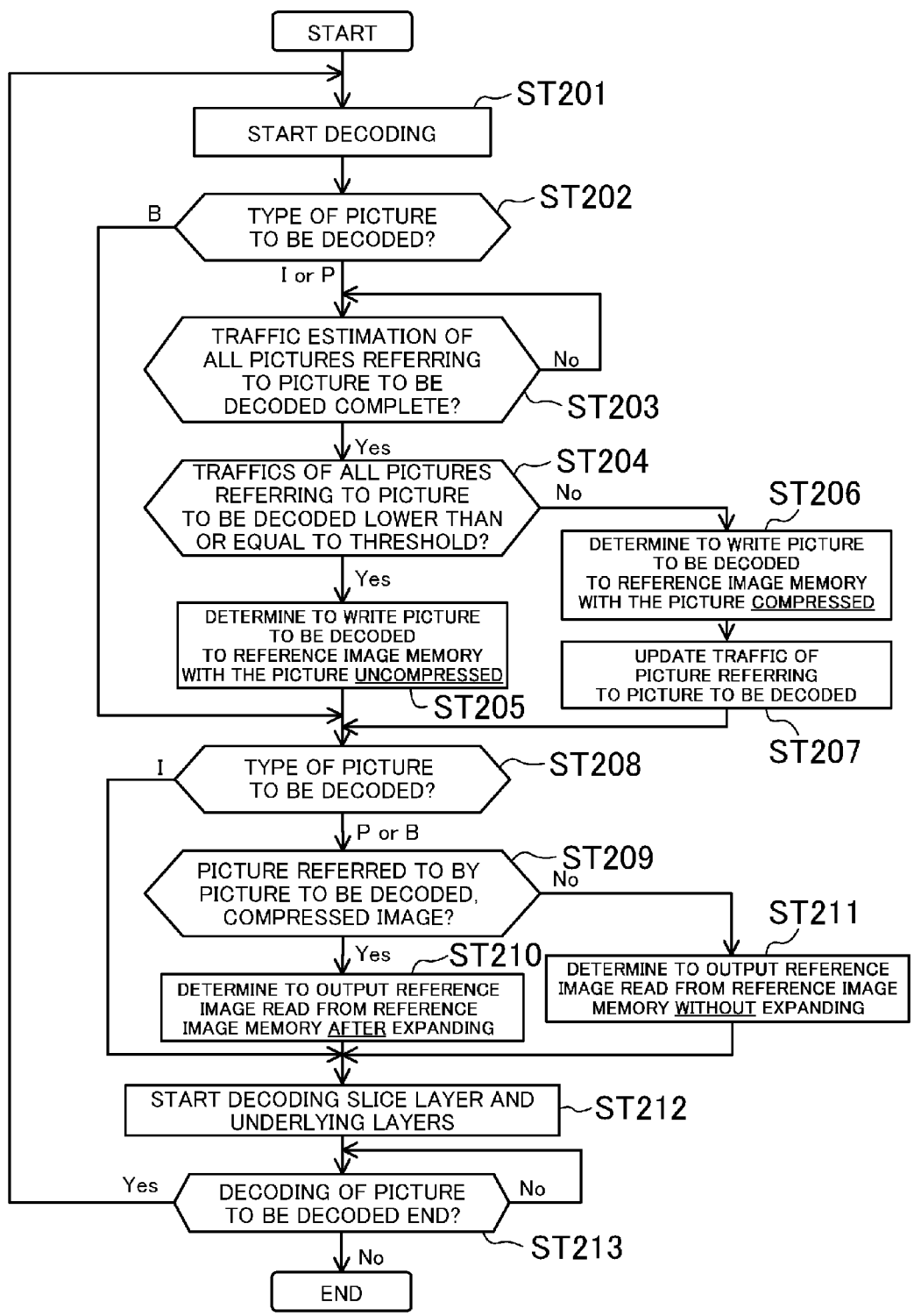
FIG. 4 is a flow chart illustrating decoding for reproduction according to the first embodiment.

A specific control flow according to this embodiment will be described with reference to FIGS. 3 and 4. FIG. 3 is a flow chart illustrating decoding for traffic estimation. FIG. 4 is a flow chart illustrating decoding for reproduction generating a reproduction image. In the figures, the moving picture stream shown in FIG. 2 is reproduced.

First, processing of the decoding for traffic estimation will be described in detail with reference to FIG. 3. In the decoding for traffic estimation, traffic to a reference image memory is merely estimated on a picture-by-picture basis. Indeed, no reference image is read from the reference image memory to generate a predictive image, and no reproduction image is written to the reference image memory as a reference image required for subsequent decoding. As a result, no access occurs to the reference image memory, thereby generating no traffic.

First, the decoding for traffic estimation starts. The variable length decoder 3 sequentially decodes an input moving picture stream from the initial I2 picture in the order of encoding, and sequentially outputs various types of encoding parameters to the traffic analyzer 6 (ST101). Next, the traffic analyzer 6 determines whether or not decoding of the picture to be subjected to traffic estimation has ended. When the decoding for 1 picture ends, the process moves to ST103 (ST102).

Then, the traffic analyzer 6 identifies the picture type of the decoded picture to be subjected to traffic estimation (ST103). Where the picture is an I-picture or a P-picture, write access to the reference image memory 5 occurs and write traffic is calculated (ST104). The write traffic can be easily calculated if the degree of resolution of the picture is known. In a P-picture, read traffic generated in referring to the picture to be subjected to forward prediction is calculated based on various encoding parameters (ST107). On the other hand, in a B-picture, read traffic generated in referring to a picture for backward prediction is calculated based on various encoding parameters (ST106). In addition, read traffic generated in referring to a picture for forward prediction is similarly calculated (ST107).

Finally, whether or not any picture to be subjected to traffic estimation is left is determined (ST108). If so, the process moves to ST101 and the above-described process is repeated.

By executing such decoding for traffic estimation, the traffic analyzer 6 calculates the specific traffic to the reference image memory 5 generated in decoding the pictures. Specifically, traffic of each picture generated in reproducing the moving picture stream shown in FIG. 2 is obtained in advance using the following simple equations. $ST(X)$ indicates the traffic of an X-picture.

$$ST(B0) = RT(B0 \leftarrow I2) \quad (1)$$

$$ST(B1) = RT(B1 \leftarrow I2) \quad (2)$$

$$ST(I2) = WT(I2) \quad (3)$$

$$ST(B3) = RT(I2 \rightarrow B3) + RT(B3 \leftarrow P5) \quad (4)$$

$$ST(B4) = RT(I2 \rightarrow B4) + RT(B4 \leftarrow P5) \quad (5)$$

$$ST(P5) = WT(P5) + RT(I2 \rightarrow P5) \quad (6)$$

$$ST(B6) = RT(P5 \rightarrow B6) + RT(B6 \leftarrow P8) \quad (7)$$

$$ST(B7) = RT(P5 \rightarrow B7) + RT(B7 \leftarrow P8) \quad (8)$$

$$ST(P8) = WT(P8) + RT(P5 \rightarrow P8) \quad (9)$$

The reference image compression controller 8 compares the traffic of the pictures, which has been calculated in advance in the decoding for traffic estimation, to an allowed memory bandwidth $AW$ of the reference image memory 5. Then, the reference image compression controller 8 determines as appropriate whether or not a reference image needs to be compressed in the decoding for reproduction.

The allowed memory bandwidth $AW$ of the reference image memory 5 corresponds to the traffic to the reference image memory 5, which is allowed in decoding 1 picture. In other words, the allowed memory bandwidth $AW$ is the value into which the bandwidth of the reference image memory 5 is converted per picture. For example, in decoding a moving picture stream having 60 pictures in per second by using a DDR400 with a data width of 32 bits as the reference image memory 5, the allowed memory bandwidth $AW$ is as follows in view of transfer loss of 20% in memory access.

$$AW = (3.2 \text{ GB/s} \times 0.8)/60 = 42.7 \text{ MB/s} \quad (10)$$

Whether or not a reference image is to be compressed is specifically determined, for example, as follows. In the moving picture stream of FIG. 2, assume that the I2 picture is decoded for reproduction. The pictures referring to the I2 picture as the reference image are in total 5 pictures of B0, B1, B3, B4, and P5, which are prior to and subsequent to the I2 picture. The traffic for each picture to the reference image memory 5 needs to be smaller than the allowed memory bandwidth $AW$ so that these pictures are normally decoded. Specifically, the traffic needs to satisfy the following equations (11)-(15).

$$ST(B0) \leq AW \quad (11)$$

$$ST(B1) \leq AW \quad (12)$$

$$ST(B3) \leq AW \quad (13)$$

$$ST(B4) \leq AW \quad (14)$$

$$ST(B5) \leq AW \quad (15)$$

Where all the equations (11)-(15) are satisfied, the reference image compression controller 8 determines that an image obtained by decoding the I2 picture is not compressed and stored in the reference image memory 5. Where at least one of the equations is not satisfied, the reference image compression controller 8 determines that the image obtained by decoding the I2 picture is compressed and then stored in the reference image memory 5.

Figure 5:
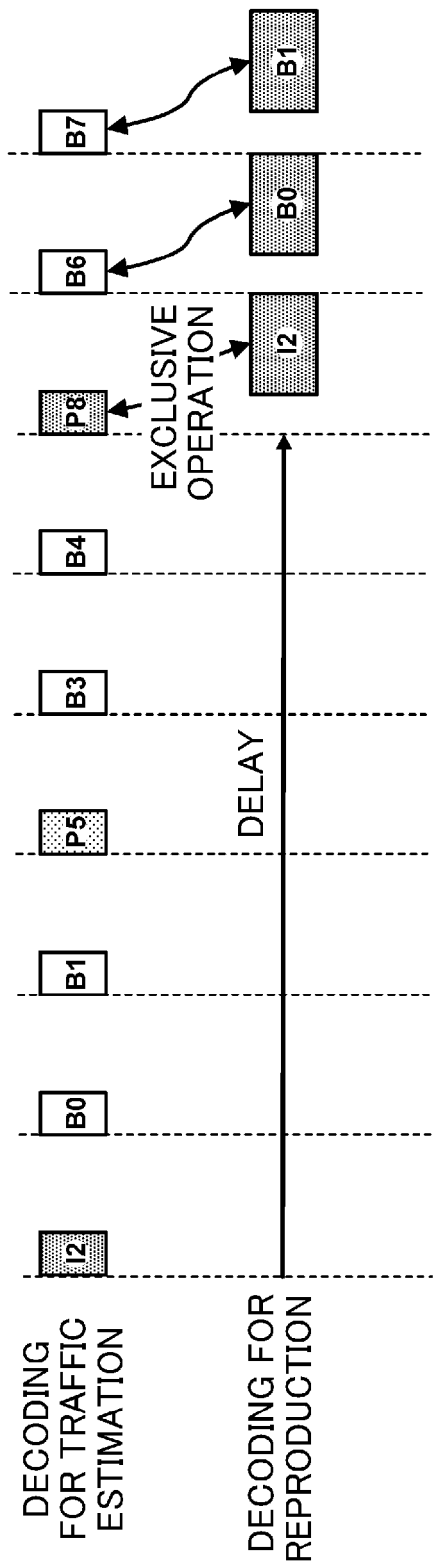
FIG. 5 illustrates timing of the decoding for the traffic estimation and the decoding for the reproduction according to the first embodiment.

The decoding for traffic estimation needs to precede the decoding for reproduction to make the above determination. That is, as shown in FIG. 5, the start of the decoding for reproduction needs to be delayed from the start of the decoding for traffic estimation by a predetermined number of pictures. The amount of the delay may be determined based on a group of pictures (GOP) structure of a moving picture stream. For example, as shown in FIG. 2, where the period M in which each I-picture or a P-picture appears, is 3 (i.e., 2 B-pictures are inserted between each pair of the I-pictures or the P-pictures), the delay may correspond to at least 6 pictures. Where M is 4 (i.e., 3 B-pictures are inserted between each pair of the I-pictures or the P-pictures), the delay may correspond to at least 8 pictures. That is, the delay may correspond to (M×2) or more pictures. If the delay until the start of reproduction is not so problematic, for example, a delay by 1 GOP may be set.

Processing of the decoding for reproduction will be described in detail with reference to FIG. 4. In the decoding for reproduction, the above-described determination as to whether or not the reference image is to be compressed is made on the picture-by-picture basis.

First, the decoding for reproduction starts. The variable length decoder 3 sequentially decodes an input moving picture stream from the initial I2 picture in the order of encoding (ST201). Since the variable length decoder 3 also operates for the decoding for traffic estimation, it performs time-shared decoding to operate exclusively as shown in FIG. 5. In the decoding for traffic estimation, no access to the reference image memory 5 occurs, and thus decoding for 1 picture ends for a relatively short time by using the variable length decoder 3 capable of high speed processing.

Then, the picture type of a picture to be decoded is identified (ST202). Where the picture is an I-picture or a P-picture, the reference image compression controller 8 checks whether or not traffic estimation of all the pictures referring to the picture to be decoded are completed (ST203). For example, where the picture to be decoded is the I2 picture, as described above, the pictures referring to the I2 picture are B0, B1, B3, B4, and P5. Thus, the reference image compression controller 8 checks whether or not the decoding for traffic estimation of all these pictures are completed. If not, it waits for the completion of the estimation by the decoding for traffic estimation.

Next, the reference image compression controller 8 checks whether or not the traffics of all the pictures referring to the picture to be decoded is smaller than the allowed memory bandwidth $AW$ (i.e., the threshold) (ST204). For example, when the picture to be decoded is the I2 picture, the reference image compression controller 8 checks whether or not all the above equations 11-15 are satisfied. When the picture to be decoded is P5 picture, the reference image compression controller 8 checks whether or not the traffic satisfies all the following five conditional equations.

$$ST(B3) \leq AW \quad (16)$$

$$ST(B4) \leq AW \quad (17)$$

$$ST(B6) \leq AW \quad (18)$$

$$ST(B7) \leq AW \quad (19)$$

$$ST(B8) \leq AW \quad (20)$$

In ST204, assume that the reference image compression controller 8 determines that the traffics of all the pictures referring to the picture to be decoded is smaller than or equal to the allowed memory bandwidth AW (Yes). Then, the reference image compression controller 8 determines not to compress the image, which is obtained by decoding the picture to be decoded, and to write the image to the reference image memory 5, and temporarily stores the determination (ST205). On the other hand, assume that the reference image compression controller 8 determines that at least one of the traffics of all the pictures referring to the picture to be decoded is greater than the allowed memory bandwidth AW (No). Then, the reference image compression controller 8 determines to compress the image, which is obtained by decoding the picture to be decoded, and to write the image to the reference image memory 5, and temporarily stores the determination (ST206). Furthermore, the reference image compression controller 8 updates the traffic of the pictures referring to the picture to be decoded (ST207). Specifically, with the compression of the picture to be decoded, the traffic of the pictures referring to the picture to be decoded also changes. Thus, the reference image compression controller 8 updates the traffic. For example, when the picture to be decoded is the I2 picture and the I2 picture is compressed and stored in the reference image memory 5, the traffics ST(B0), ST(B1), ST(B3), ST(B4), and ST(P5) of the pictures B0, B1, B3, B4, and P5 referring to the I2 picture also change. The traffics ST(B3) and ST(B4) of the pictures B3 and B4 are used to determine whether or not to compress the P5 picture when the picture to be decoded is P5 picture, as represented by the equations 16 and 17. Thus, the traffic needs to be updated.

As such, the compression mode (herein, whether or not to compress the image) in storing the restored image generated by decoding the picture to be decoded in the reference image memory 5 is determined. In ST202, where the picture to be decoded is identified as a B-picture, no writing to the reference image memory 5 occurs, and the above-described processing related to the writing settings are skipped, and the process moves to ST208, which will be described later.

Then, the processing of decoding the picture to be decoded by sequentially reading the reference images stored in the reference image memory 5 will be described.

First, the picture type of the picture to be decoded is identified again (ST208). Where the picture is a P-picture or a B-picture, the reference image compression controller 8 checks whether or not the picture referred to by the picture to be decoded is compressed (ST209). If the image is a compressed image (Yes), the reference image compression controller 8 determines to expand the picture to be referred to, after reading the picture from the reference image memory 5 (ST210). If the image is an uncompressed image (No), the reference image compression controller 8 determines not to expand the picture to be referred to, after reading the picture from the reference image memory 5 (ST211). In ST208, where the picture is identified as an I-picture, there is no need to read the reference image from the reference image memory 5, the process skips to ST212, which will be described later.

As such, the read settings of the reference image in decoding the picture to be decoded are performed, and decoding of the slice layer and the underlying layers in the picture starts (ST212). Read/write access to the reference image in the reference image memory 5 is performed by the write controller 9 and the read controller 10 based on the write/read settings, which have already been determined. At the end of the decoding of the picture to be decoded for 1 picture, it is checked whether or not any picture to be decoded in the moving picture stream remains unreproduced (ST213). If so, the process moves to ST201, and the above-described process is repeated. If not, the process ends.

In the above-description, various types of encoding parameters such as the encoding types of macroblocks, the directions of prediction, the sizes for motion compensation and motion vectors are used to accurately estimate the traffic to the reference image memory 5 on the picture-by-picture basis. However, the means for estimating the traffic are not limited thereto. For example, one or more of the encoding parameters may be used to simply estimate the traffic instead of using all the encoding parameters.

For example, the traffic may be simply estimated based on the number of inter-macroblocks in a picture. Alternatively, the traffic may be simply estimated based on the number of motion vectors extracted for a picture. Furthermore, the traffic may be simply estimated based on the number of macroblocks in each size for motion compensation extracted for a picture.

In the above description, the traffic of each picture having been estimated in advance is compared to the allowed memory bandwidth AW, and whether or not the picture to be decoded is compressed is determined based on the comparison result. However, the comparison processing for determining the compression mode of the reference image is not limited thereto. For example, a plurality of pictures referring to the picture to be decoded are regarded as a single unit, and the average of the traffics for the pictures may be compared to the allowed memory bandwidth AW. Specifically, where the picture to be decoded is the I2 picture, the average of the traffics ST(B0), ST(B1), ST(B3), ST(B4), and ST(P5) of 5 pictures referring to the I2 picture is compared to the allowed memory bandwidth AW, and whether or not the reference image obtained by the I2 picture is compressed is determined based on the comparison result.

While the reference image memory 5 is used only for reproducing moving picture streams in the above description, the reference image memory 5 may be used for other processing different from the reproduction of moving picture streams. In this case, the reproduction of moving picture streams and the other processing are collaborated to prevent a conflict of access to the reference image memory 5. At this time, the allowed memory bandwidth AW used for the comparison processing may be set to the value obtained by subtracting the traffic required by the other processing from the value calculated in the above description.

In the above description, the single allowed memory bandwidth AW is set, and whether or not the reference image is compressed is determined based on the result of the comparison between the allowed memory bandwidth AW and the traffic. The settings of the allowed memory bandwidth AW and the determination of the compression mode are not limited thereto. For example, a plurality of allowed memory bandwidths AW may be set as predetermined thresholds, and any one of a plurality of compression rates may be selected by the comparison processing between the plurality of allowed memory bandwidths AW and the traffic. Specifically, for example, two allowed memory bandwidths AW1 and AW2 are set, and compared to the traffic of each picture. The compression mode is determined as follows. Where the traffic of the picture is smaller than or equal to AW1, the picture to be decoded may not be compressed. Where the traffic is greater than AW1 and smaller than or equal to AW2, the picture to be decoded may be compressed to 75% of the original. Where the traffic is greater than AW2, the picture to be decoded may be compressed to 50% of the original, which is a higher compression rate.

When a reference image is compressed, the compression rates of the luminance component and the color difference component may be determined independently. For example, the compression rate of the luminance component is preferably lower than the compression rate of the color difference component, since distortion of the luminance component is easily found by human eyes.

As described above, according to this embodiment, the actually generated traffic to a reference image memory is estimated in advance on a picture-by-picture basis in decoding and reproducing a moving picture stream, and the reference image is compressed and stored where the traffic is greater than the allowed memory bandwidth of the reference image memory. This reduces temporal transmission of distortion due to compression of the reference image, which occurs in decoding, as much as possible. There is no need to mount an unnecessarily high performance memory on the assumption of the worst case, which is least likely to occur, thereby reducing the costs and the power consumption at the same time. Different from the conventional techniques, there is no need to store both compressed reference images and uncompressed reference images, thereby providing image reproduction with relatively small memory capacity, and causing no duplicated write access to a reference image memory.

Second Embodiment

Figure 6:
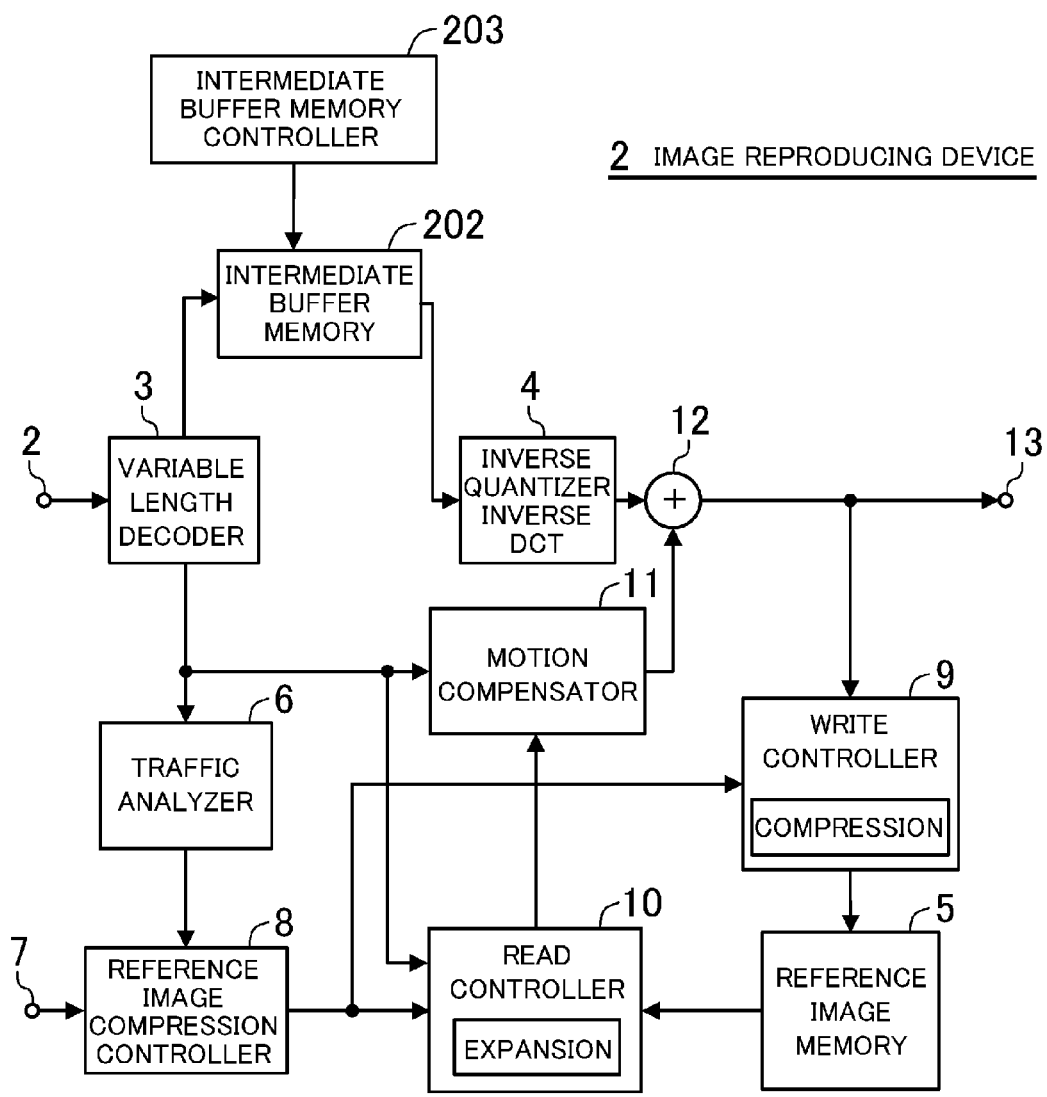
FIG. 6 illustrates the configuration of an image reproducing device according to a second embodiment.

FIG. 6 illustrates the configuration of an image reproducing device 2 according to a second embodiment. In FIG. 6, the same reference characters as those shown in FIG. 1 are used to represent equivalent elements, and the explanation thereof will be omitted. Different from the first embodiment, FIG. 6 additionally shows an intermediate buffer memory 202 for temporarily storing intermediate data decoded in the variable length decoder 3, and an intermediate buffer memory controller 203 for performing write/read control of the intermediate buffer memory 202.

In the first embodiment, the decoding for traffic estimation and the decoding for reproduction start at different times, and the variable length decoder 3 exclusively operates. However, a moving picture stream is subjected to variable length decoding once in the preceding decoding for traffic estimation, and variable length decoding of the same stream is performed for the decoding for reproduction. That is, the decoding is redundant, thereby requiring extra time for the decoding for reproduction. It is an objective of this embodiment to reduce the extra time for decoding for reproduction.

Processing in this embodiment will be described below in detail.

First, similar to the first embodiment, decoding for traffic estimation starts. The variable length decoder 3 performs all decoding in not only a picture layer but also in a slice layer, and a macroblock layer to estimate the specific traffic of each picture. In the first embodiment, among the decoded data, only various types of encoding parameters, which are required for traffic estimation, are sequentially output to the traffic analyzer 6. In addition, in this embodiment, decoded image data (i.e., quantization coefficients) of macroblock layers are temporarily stored as intermediate data in the intermediate buffer memory 202. Specifically, the image data of the macroblock layers, which is sequentially output from the variable length decoder 3, is stored in the intermediate buffer memory 202 by write control of the intermediate buffer memory controller 203.

In decoding for reproduction, a moving picture stream is not subjected to variable length redecoding again. The image data of the picture to be decoded, which is temporarily stored in the intermediate buffer memory 202, is sequentially read by read control of the intermediate buffer memory controller 203, and used for decoding.

As such, according to this embodiment, the intermediate data obtained by decoding processing in the decoding for traffic estimation is temporarily stored in the intermediate buffer memory 202. The intermediate data is read from the intermediate buffer memory 202 in the decoding for reproduction to generate a reproduction image. This requires variable length decoding of each picture only once, thereby increasing the speed of the decoding for reproduction. This is advantageous in not requiring a variable length decoder capable of high-speed processing.

In the above description, the image data (i.e., the quantization coefficients) generated by the variable length decoding is stored as the intermediate data in the intermediate buffer memory 202. The intermediate data stored in the intermediate buffer memory 202 is not limited thereto. For example, in decoding a moving picture stream according to the H.264 standard, to which variable length encoding is performed by combining binarization and arithmetic coding, the binary data after the arithmetic decoding may be stored as the intermediate data in the intermediate buffer memory 202. The binary data corresponds to compressed image data (i.e., a quantization coefficient). By storing the binary data as the intermediate data, the intermediate buffer memory 202 is formed by a memory with relatively small capacity.

While, in the above description, the reference image memory 5 and the intermediate buffer memory 202 are formed independently from each other, the configuration is not limited thereto. The reference image memory 5 and the intermediate buffer memory 202 may form a single common memory. In this case, the memory may be exclusively controlled so that the both operations do not influence each other.

Third Embodiment

Figure 7:
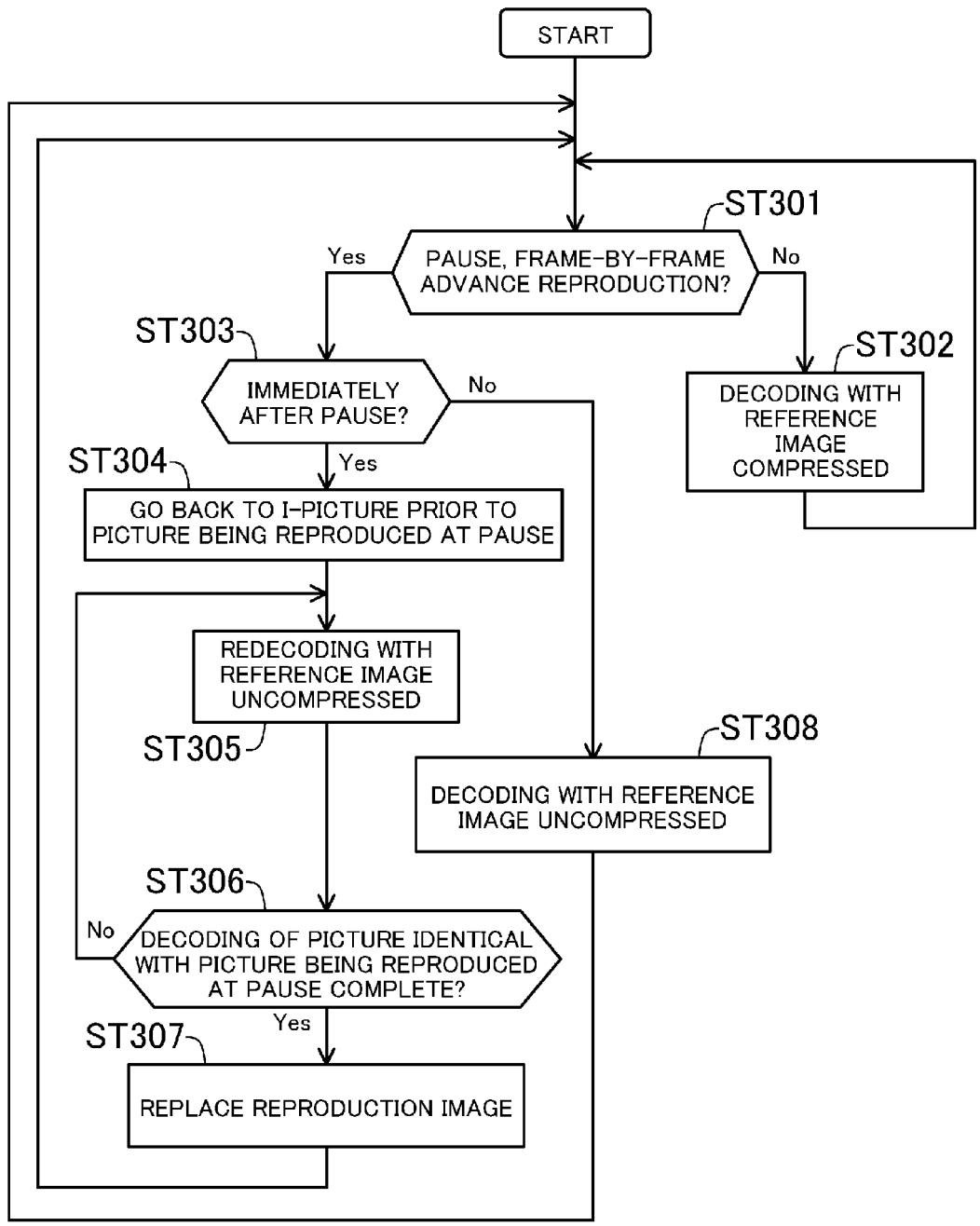
FIG. 7 is a flow chart illustrating an image reproducing method according to a third embodiment.

FIG. 7 is a flow chart illustrating an image reproducing method according to a third embodiment. In this embodiment, processing of pause and frame-by-frame advance reproduction while reproducing a moving picture stream using the image reproducing methods according to the first and second embodiments will be described in detail.

In the image reproducing methods described in the first and second embodiments, a reference image is compressed only where the traffic to the reference image memory 5 is greater than the allowed memory bandwidth. This reduces temporal transmission of distortion due to compression of the reference image in decoding as much as possible. However, assume that the reference image memory 5 with a relatively small allowed memory bandwidth is used to form an image reproducing device, and a moving picture stream causing great traffic to the reference image memory 5 is reproduced. Then, the reference image is frequently compressed, thereby increasing the temporal transmission of distortion due to compression of the reference image. In this case, however, it is relatively difficult to visually find the distortion due to compression of the reference image in normal reproduction of a moving picture, and thus the distortion is not so problematic. By contrast, for example, distortion is more visible in a pause, in which a still image is displayed, or in frame-by-frame advance reproduction.

One of the features of this embodiment is to change the control not to compress a reference image regardless of the traffic of each picture, when distortion due to compression of the reference image is likely to become visible, for example, in a pause or frame-by-frame advance reproduction.

The feature will be described below in detail with reference to FIG. 7.

First, it is determined whether or not an instruction for a pause or frame-by-frame advance reproduction is implemented in reproducing a moving picture stream using the image reproducing methods described in the first and second embodiments (ST301). Since frame-by-frame advance reproduction is not suddenly performed in reproducing a moving image, whether or not a pause instruction is implemented is determined first in normal reproduction of a moving picture. If no pause instruction is implemented (No), the process proceeds further and the moving picture stream is reproduced with a reference image compressed (the compression mode is determined in accordance with the traffic of the picture) (ST302). On the other hand, if a pause instruction is implemented (Yes), whether or not it is immediately after a pause is determined (ST303). If it is immediately after the pause (Yes), distortion due to compression of the reference image is highly visible, and thus the process goes back to the I-picture, which is prior to the picture being reproduced at the pause (ST304). Then, redecoding is performed with the reference image uncompressed (ST305). After that, whether or not the decoded picture is identical to the picture being reproduced at the pause is determined (ST306). If not (No), the process moves to ST305, and the next picture is redecoded with the reference image uncompressed. Similarly, when a picture is sequentially redecoded, and the identical picture with the picture being reproduced at the pause is redecoded (Yes), the reproduction image is replaced (ST307) and the process moves to ST301. If frame-by-frame advance reproduction continuously follows the pause (Yes in ST301 and No in ST303), decoding is performed with the reference image uncompressed, so that distortion due to compression of the reference image is temporally transmitted (ST308).

As such, if distortion due to compression of the reference image is visually easily found, for example, in a pause, in which a still image is displayed, or in frame-by-frame advance reproduction, decoding is performed with the reference image uncompressed. This avoids distortion due to compression of a reference image in a pause or frame-by-frame advance reproduction, thereby providing more preferable reproduction of a moving picture stream, and a preferable image reproducing device assuming actual use.

In this embodiment, in a pause, the process goes back to the I-picture, redecoding is performed with the reference image uncompressed, and the image to be displayed is replaced. This causes a slight time lag until a reproduction image without distortion due to compression of the reference image is generated. However, in an actual image reproducing device, the time lag is up to about 0.5 seconds and is not problematic in view of viewers' sensible speed. In frame-by-frame advance reproduction, since decoding is performed in the traffic, which is greater than the allowed memory bandwidth, with the reference image uncompressed, a little time is required for the decoding. However, since the frame-by-frame advance reproduction does not require real time processing as compared to normal reproduction of a moving picture, the time lag is not problematic.

Fourth Embodiment

Figure 8:
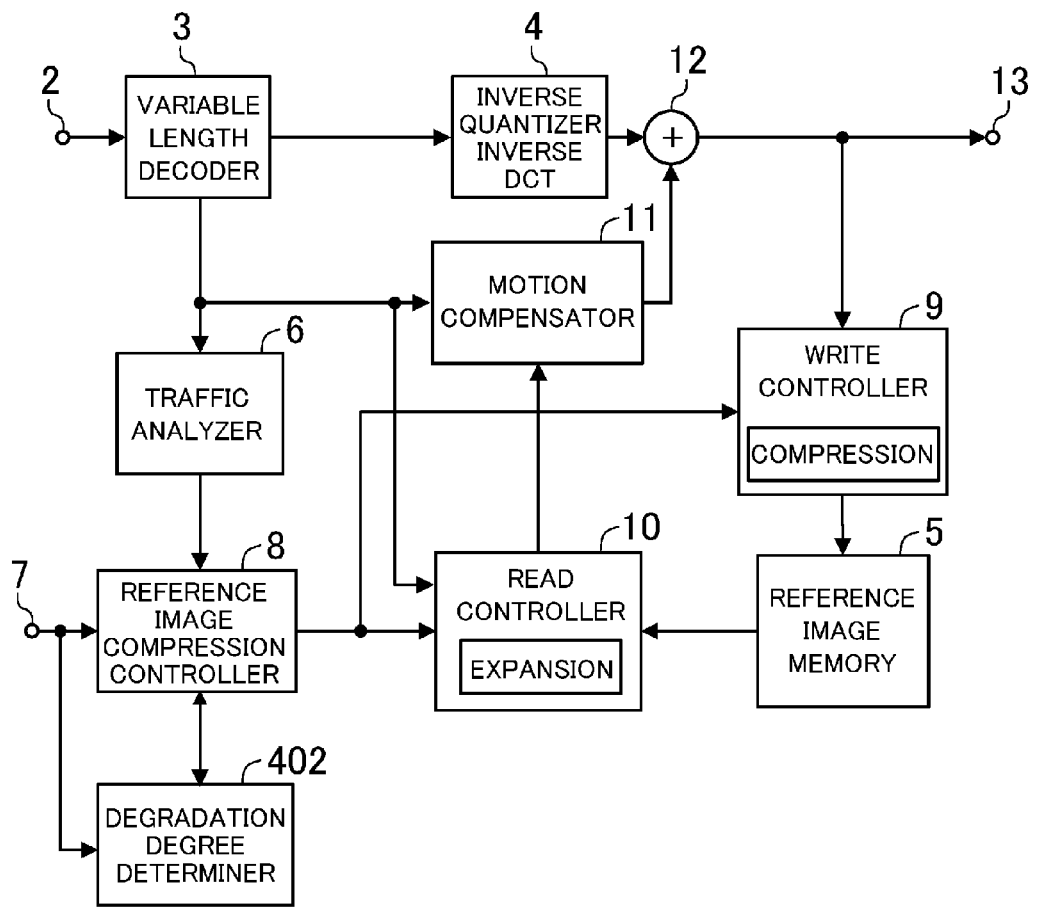
FIG. 8 illustrates the configuration of an image reproducing device according to a fourth embodiment.
Figure 9:
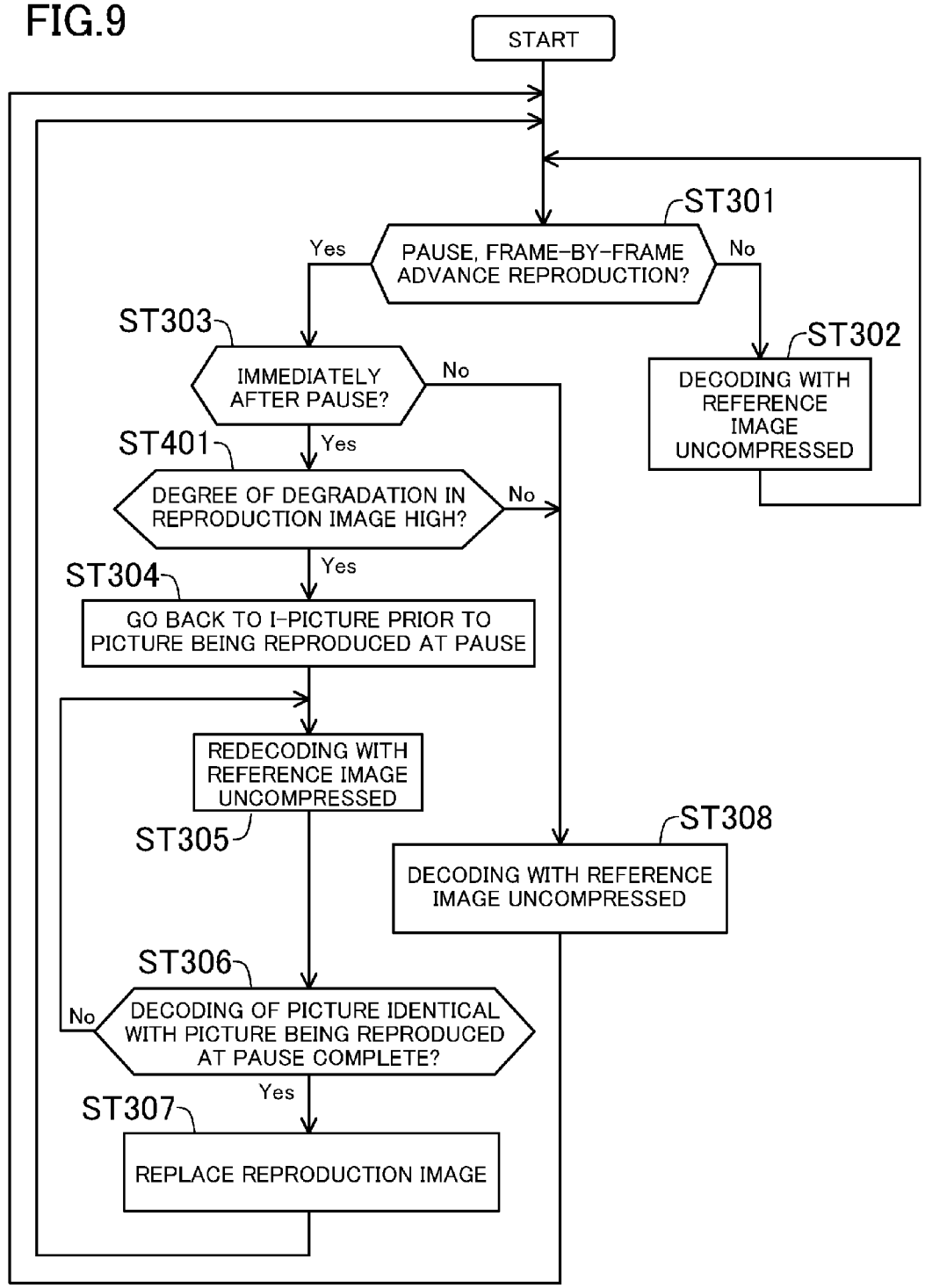
FIG. 9 is a flow chart illustrating an image reproducing method according to the fourth embodiment.

FIG. 8 illustrates the configuration of an image reproducing device 4 according to a fourth embodiment. FIG. 9 is a flow chart illustrating an image reproducing method according to the fourth embodiment. In FIG. 8, the same reference characters as those shown in FIG. 1 are used to represent equivalent elements, and the explanation thereof will be omitted. Different from the first embodiment, FIG. 8 additionally shows a degradation degree determiner 402 which determines the degree of degradation in a reproduction image caused by distortion due to compression of a reference image in a pause or frame-by-frame advance reproduction. In FIG. 9, the same reference characters as those shown in FIG. 7 are used to represent equivalent steps, and the explanation thereof will be omitted. Different from the third embodiment, FIG. 9 additionally shows a step ST401 of determining the degree of degradation in a reproduction image in a pause or frame-by-frame advance reproduction.

Specifically, assume that a moving picture stream is reproduced in the compression mode of a reference image controlled as described in the first and second embodiments. When a pause instruction is implemented, the picture reproduced at that time may have great or small temporal transmission of distortion due to compression of the reference image. For example, if an I-picture is reproduced, to which no distortion due to compression of a reference image is temporally transmitted, and a pause is provided at a relatively early stage after that, there is no problem even without redecoding back to the I-picture because there is less temporal transmission of the distortion due to the compression of the reference image. On the other hand, if a pause is provided in a while after an I-picture is reproduced, distortion due to compression of the reference image is greatly temporally transmitted. Thus, distortion due to compression of the reference image becomes highly visible in the image, if no redecoding back to the I-picture is performed.

One of the features of this embodiment is that the degradation degree determiner 402 performs the determination in the step ST401. Specifically, in the step ST401, the degradation degree determiner 402 determines whether or not the reproduction image obtained by decoding the picture being reproduced at the pause has a great degree of degradation. If the degree of degradation is relatively great (Yes), the process goes back to the I-picture, which is prior to the picture being reproduced at the pause (ST304), and redecoding is performed with the reference image uncompressed (ST305). Similarly, when pictures are sequentially redecoded, and an identical picture with the picture being reproduced at the pause is redecoded (Yes in ST306), the reproduction image is replaced (ST307). On the other hand, if the degree of degradation is relatively small (No in ST401), decoding is performed with the reference image uncompressed (ST308). The frequency of redecoding back to the I-picture is reduced by adding the step ST401 as compared to the third embodiment.

Determination in the step ST401 is performed, for example, as follows. Specifically, the temporal distance from the I-picture, which is allowable for image quality, is set by a setting terminal 7 as the threshold for determining the degree of degradation in the reproduction image in a pause. Then, the temporal distance from the I-picture to the picture being reproduced at the pause is compared to the threshold, thereby determining whether the degree of degradation is high or low.

Alternatively, instead of or in addition to the temporal distance from the I-picture, the determination may be performed by using the frequency of transmission of distortion due to compression of the reference image to the picture being reproduced at the pause.

Example Configuration of System

Figure 10:
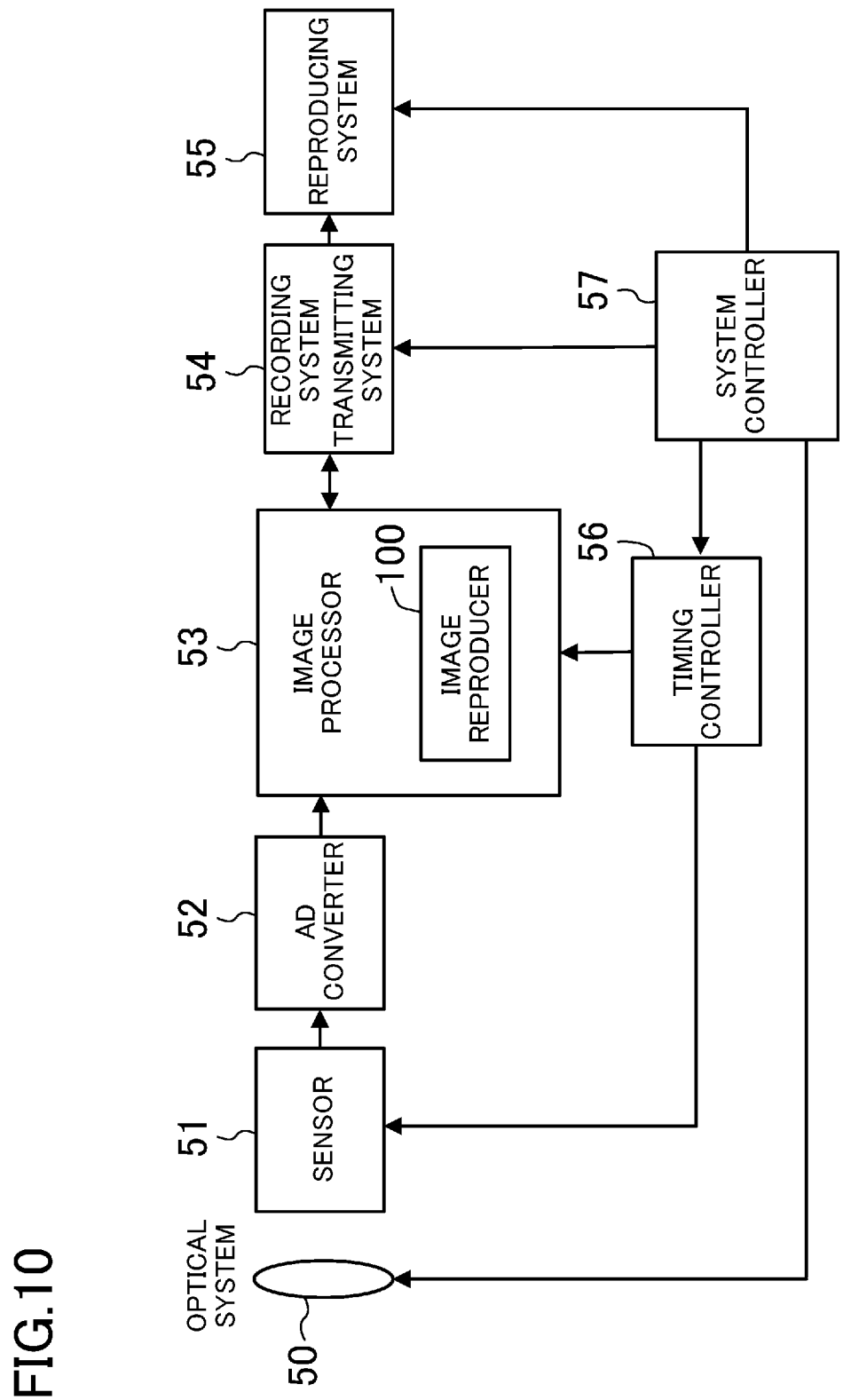
FIG. 10 illustrates an example configuration of an imaging system.
Figure 11:
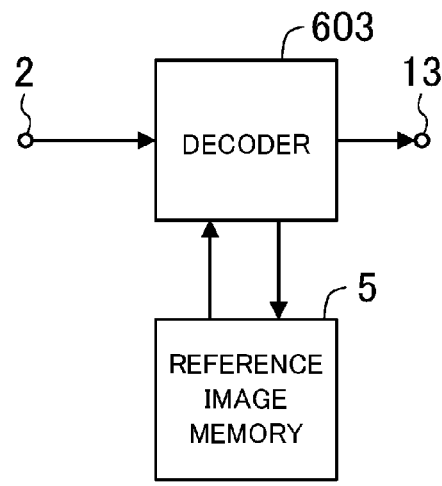
FIG. 11 illustrates the configuration of a conventional image reproducing device.
Figure 12:
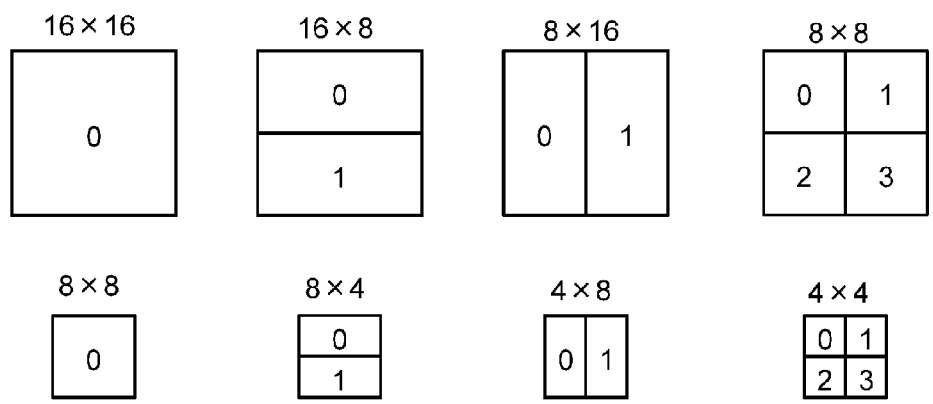
FIG. 12 illustrates the sizes for motion compensation in the H.264 standard.

The image reproducing methods according to the above-described embodiments can be used for, for example, imaging systems (i.e., video systems) such as digital video cameras and digital still cameras. FIG. 10 illustrates an example configuration of such an imaging system. The imaging system of FIG. 10 utilizes the image reproducing methods according to the embodiments. An image processor 53 includes an image reproducer 100 capable of executing the image reproducing methods according to the embodiments, and performs image processing.

In the imaging system of FIG. 10, image light incident through an optical system 50 is formed on a sensor 51, and subjected to photoelectric conversion. The electrical signals obtained by the photoelectric conversion are supplied to an AD converter 52 as analog image signals. The AD converter 52 converts the input analog image signals to digital image signals, and then outputs the digital image signals to the image processor 53. The image processor 53 performs Y/C processing, edge treatment, scaling of images, compression/expansion of images under the standards such as the JPEG and the MPEG, control of streams including compressed images, etc. The processed image signals are recorded in a medium, or transmitted via the Internet in a recording/transmitting system 54. The recorded or transmitted signals are reproduced by the reproducing system 55. The sensor 51 and the image processor 53 are controlled by a timing controller 56. The optical system 50, the recording/transmitting system 54, the reproducing system 55, and the timing controller 56 are controlled by a system controller 57.

The imaging system shown in FIG. 10 is used for cameras, etc., in which image light from the optical system 50 is subjected to photoelectric conversion in the sensor 51 and input to the AD converter 52. The usage is not limited thereto. For example, the imaging system of FIG. 10 may supply as analog image signals, an analog image input of audio-visual equipment such as a TV directly to the AD converter 52.

The above-described embodiments are similarly applicable to a reproducing system, which corresponds to the imaging system shown in FIG. 10 without elements for imaging such as the optical system 50 and the sensor 51.

The image reproducing methods according to the above-described embodiments can be implemented by a system including a computer, which executes a program for implementing the methods. The methods may be implemented by recording the program for implementing the methods in a computer-readable recording medium, and allowing the computer to execute the program recorded in the recording medium.

The present disclosure provides the image reproducing technique, which reduces temporal accumulation of compression distortion in decoding, at low costs and with low power consumption. Thus, the present disclosure is useful for, for example, imaging devices such as digital video cameras and digital still cameras, image viewers such as digital photo storages and digital photo frames, mobile devices such as mobile phones, etc., which require moving picture reproduction at low costs and high speed, and with low power consumption.

What is claimed is:

1. An image reproducing method of decoding a moving picture stream having been subjected to inter-picture prediction encoding with accessing a reference image memory, the method comprising:
    performing first decoding for decoding the moving picture stream on a picture-by-picture basis to estimate traffic to the reference image memory on the picture-by-picture basis; and
    performing second decoding for decoding the moving picture stream on the picture-by-picture basis to generate a reproduction image, wherein:
    when a picture to be decoded is to be stored as a reference image in the reference image memory after the picture is decoded,
        in the first decoding to estimate traffic, it is determined whether compression of a reference image is needed in advance, and
        in the second decoding, if it is determined that compression of the reference image is needed, a compression mode in storing the picture to be decoded in the reference image memory is determined in advance based on the traffic for a picture referring to the picture to be decoded, which has been estimated in the first decoding, and a compressed image of the picture to be decoded is stored in the reference image memory, and if it is determined that compression of the reference image is not needed, a non-compressed image of the picture to be decoded is stored in the reference image memory.

2. The method of claim 1, wherein in the first decoding, the reference image memory is not accessed, and an encoding parameter used for traffic estimation is extracted by variable length decoding of the moving picture stream.

3. The method of claim 2, wherein the encoding parameter extracted in the first decoding includes at least one of an encoding type of macroblocks, a direction of prediction, a size for motion compensation, or a motion vector.

4. The method of claim 2, wherein in the first decoding, traffic estimation is based on a number of inter-macroblocks existing in the picture.

5. The method of claim 2, wherein in the first decoding, traffic estimation is based on a number of motion vectors extracted for the picture.

6. The method of claim 2, wherein in the first decoding, traffic estimation is based on a number of macroblocks in each size for motion compensation extracted for the picture.

7. The method of claim 1, wherein in the second decoding, whether or not the picture to be decoded is compressed is determined by comparison processing between a predetermined threshold and the traffic for the picture referring to the picture to be decoded.

8. The method of claim 7, wherein in the comparison processing, respective traffics for a plurality of pictures referring to the picture to be decoded are compared to the predetermined threshold.

9. The method of claim 7, wherein in the comparison processing, an average of traffics for a plurality of pictures referring to the picture to be decoded is compared to the predetermined threshold.

10. The method of claim 7, wherein the predetermined threshold is a value into which a bandwidth of the reference image memory is converted per picture.

11. The method of claim 7, wherein
    the reference image memory is used for other processing different from reproduction of the moving picture stream, and the predetermined threshold is a value obtained by subtracting traffic required by the other processing from a value into which a bandwidth of the reference image memory is converted per picture.

12. The method of claim 1, wherein in the second decoding, a compression rate of the picture to be decoded is determined by comparison processing between a plurality of predetermined thresholds and the traffic for the picture referring to the picture to be decoded.

13. The method of claim 12, wherein compression rates of a luminance component and a color difference component of the picture to be decoded are independently determined.

14. The method of claim 1, wherein
the second decoding includes temporarily storing the compression mode determined for the picture to be decoded, and
the picture to be decoded is read as the reference image from the reference image memory in an expansion mode corresponding to the stored compression mode.

15. The method of claim 1, wherein
the second decoding starts after a delay of a predetermined number of pictures from start of the first decoding, and
the predetermined number is (M×2) or more where an I-picture or a P-picture appears with a period M, where M is an integer, in a group of pictures (GOP) of the moving picture stream.

16. The method of claim 1, wherein
in the first decoding, intermediate data obtained by the decoding is temporarily stored in an intermediate buffer memory, and
in the second decoding, the intermediate data is read from the intermediate buffer memory and used to generate the reproduction image.

17. The method of claim 1, wherein
when a pause instruction is implemented in reproducing the moving picture stream, a process goes back to an I-picture, which is prior to a picture being reproduced at the pause and the moving picture stream is sequentially redecoded from the I-picture with the reference image uncompressed, and
the reproduction image is replaced when redecoding of the picture being reproduced at the pause ends.

18. The method of claim 1, wherein after an instruction for frame-by-frame advance reproduction is implemented in reproducing the moving picture stream, decoding is performed with the reference image uncompressed.

19. The method of claim 1, wherein
when a pause instruction is implemented in reproducing the moving picture stream, a degree of degradation in the reproduction image caused by transmission of distortion due to compression of the reference image is determined,
where the degree of degradation is relatively high, a process goes back to an I-picture, which is prior to a picture being reproduced at the time of pause, and the moving picture stream is sequentially redecoded from the I-picture with the reference image uncompressed, and a reproduction image is replaced when redecoding of the picture being reproduced at the pause ends, and where the degree of degradation is relatively low, the decoding is performed with the reference image uncompressed.

20. The method of claim 19, wherein the degree of degradation is determined using a temporal distance from the I-picture to the picture being reproduced at the pause.

21. The method of claim 19, wherein the degree of degradation is determined using frequency of transmission of distortion due to compression of the reference image to the picture being reproduced at the pause.

22. A non-transitory computer readable medium storing an image reproducing program for allowing a computer to execute image reproduction of decoding a moving picture stream having been subjected to inter-picture prediction encoding with a reference image memory accessed, wherein:
the image reproduction includes:
performing first decoding for decoding the moving picture stream on a picture-by-picture basis to estimate traffic to the reference image memory on the picture-by-picture basis; and
performing second decoding for decoding the moving picture stream on the picture-by-picture basis to generate a reproduction image, and in the second decoding,
when a picture to be decoded is to be stored as a reference image in the reference image memory after being decoded,
in the first decoding, it is determined whether compression of the reference image is needed in advance, and
in the second decoding, if it is determined that compression of the reference image is needed, a compression mode in storing the picture to be decoded in the reference image memory as the reference image is determined in advance based on the traffic for a picture referring to the picture to be decoded, which has been estimated in the first decoding and a compressed image of the picture to be decoded is stored in the reference image memory, and if it is determined that compression of the reference image is not needed, a non-compressed image of the picture to be decoded is stored in the reference image memory.

23. An imaging system comprising:
an image processor including an image reproducer capable of executing the image reproducing method of claim 1, and being configured to perform image processing; and
an AD converter configured to convert an input analog image signal to a digital image signal and output the digital image signal to the image processor.

24. The imaging system of claim 23, further comprising:
an optical system; and
a sensor configured to receive image light formed by the optical system, photoelectrically convert the image light to an electric signal, and output the electric signal as the analog image signal to the AD converter.

25. A reproducing system comprising an image processor including an image reproducer capable of executing the image reproducing method of claim 1, and configured to perform image processing.

* * * * *